(12) United States Patent
Anguiano Jimenez

(10) Patent No.: US 9,412,139 B2
(45) Date of Patent: Aug. 9, 2016

(54) METHOD AND SYSTEM FOR NOTARISING ELECTRONIC TRANSACTIONS

(75) Inventor: Jose Maria Anguiano Jimenez, Madrid (ES)

(73) Assignee: LOGALTY SERVICIOS DE TERCERO DE CONFIANZA, S.L., Madrid (ES)

( * ) Notice: Subject to any disclaimer, the term of this patent is extended or adjusted under 35 U.S.C. 154(b) by 740 days.

(21) Appl. No.: 12/597,450

(22) PCT Filed: Apr. 26, 2007

(86) PCT No.: PCT/ES2007/000249
§ 371 (c)(1),
(2), (4) Date: Jan. 12, 2010

(87) PCT Pub. No.: WO2008/132248
PCT Pub. Date: Nov. 6, 2008

(65) Prior Publication Data
US 2010/0138904 A1  Jun. 3, 2010

(51) Int. Cl.
*H04L 29/06* (2006.01)
*G06Q 50/18* (2012.01)

(52) U.S. Cl.
CPC ...................................... *G06Q 50/18* (2013.01)

(58) Field of Classification Search
USPC .................................................. 713/155, 193
See application file for complete search history.

(56) References Cited

U.S. PATENT DOCUMENTS

| 5,136,647 | A | * | 8/1992 | Haber et al. | ................... | 713/178 |
| 5,189,700 | A |  | 2/1993 | Blandford |  |  |
| 8,677,124 | B2 | * | 3/2014 | Lafon et al. | ................... | 713/168 |
| 2001/0037453 | A1 | * | 11/2001 | Mitty | ...................... | H04L 51/30 |
|  |  |  |  |  |  | 713/168 |
| 2004/0111530 | A1 | * | 6/2004 | Sidman | ......................... | 709/245 |
| 2004/0139319 | A1 |  | 7/2004 | Favazza et al. |  |  |
| 2005/0159135 | A1 | * | 7/2005 | Kim | ......................... | H04L 29/06 |
|  |  |  |  |  |  | 455/410 |
| 2005/0182821 | A1 | * | 8/2005 | Chan et al. | ................... | 709/207 |
| 2005/0182956 | A1 |  | 8/2005 | Ginter et al. |  |  |
| 2005/0210009 | A1 | * | 9/2005 | Tran | .................. | 707/3 |
| 2006/0129627 | A1 | * | 6/2006 | Phillips et al. | ................ | 709/200 |
| 2007/0220259 | A1 | * | 9/2007 | Pavlicic | ........................ | 713/176 |
| 2007/0226507 | A1 | * | 9/2007 | Schilling | .............. | G06F 21/645 |
|  |  |  |  |  |  | 713/176 |
| 2008/0028220 | A1 | * | 1/2008 | Wyssen | .................... | G07D 7/20 |
|  |  |  |  |  |  | 713/176 |
| 2008/0100874 | A1 | * | 5/2008 | Mayer | .................. | G06F 21/645 |
|  |  |  |  |  |  | 358/403 |
| 2008/0235043 | A1 | * | 9/2008 | Goulandris et al. | ............. | 705/1 |

FOREIGN PATENT DOCUMENTS

EP   1 233 584 A1   8/2002
ES   2 182 671 A1   3/2003

* cited by examiner

*Primary Examiner* — Joseph P Hirl
*Assistant Examiner* — Chi Nguy
(74) *Attorney, Agent, or Firm* — Sughrue Mion, PLLC

(57) ABSTRACT

The invention relates to a system comprising: a first computerized system, or emitter, connected to a communication network; a second computerized system, or receiver, connected to said network; and a server connected to said network. Said server operates as a trusted third party for electronic transactions, is adapted in such a way as to offer a custody service and to vouch for the existence and content of an electronic document sent by the emitter, and communicates with a timestamping entity.

The invention also relates to a method according to which the system is used to send a notification and/or contracting request for a receiver and an associated electronic document, from an emitter to said server, and to allow the receiver to securely access said document stored in a repository of the server, the transaction executed being traceable from beginning to end, and repudiation in the origin and destination avoided.

19 Claims, 5 Drawing Sheets

METHOD AND SYSTEM FOR NOTARISING ELECTRONIC TRANSACTIONS

CROSS REFERENCE TO RELATED APPLICATIONS

This application is a National Stage of International Application No. PCT/ES2007/000249 filed Apr. 26, 2007, the contents of all of which are incorporated herein by reference in their entirety.

OBJECT OF THE INVENTION

The present invention, method and system for notarising electronic transactions, relates to a method and system which allows the notification and procurement of any type of electronic transaction in a secure manner, avoiding the repudiation in the origin and destination through a communication network, assuring the integrity of the content of the transactions and said transaction executed being traceable from beginning to end.

STATE OF THE ART

When a paper-based transaction is executed today, any type of manipulation of the transaction may involve serious problems. These manipulations may be due to falsifications, accidental or intentional manipulations, being lost or delayed in the post, disputes as to the exact time of sending or receiving, etc.

This type of manipulation can lead to serious problems, such as fraudulent actions in which one of the parties involved denies responsibility for the document, for sending or receiving it, or perhaps for the exact time in which such events took place.

Mechanisms as common as written signatures, stamped receipts, postmarks, certified postal mail and even the participation of public notaries are used to prevent or at least hinder these unlawful actions.

In the transactions executed through electronic processes, the drawbacks that may arise are similar to those mentioned above. When the transaction is executed electronically, these drawbacks are more difficult to resolve than their analogues in paper-based transactions since the entities are normally distributed in different locations, the transactions are not executed in person, the acceptance of the parties occurs at different times, and in no case is there physical evidence of the transaction.

Therefore, by using a distributed communication environment, it is necessary to prevent the entities from being able to successfully deny having sent, received or accepted certain messages or documents, i.e., it is necessary to be able to make each one take responsibility for his commitments and his actions.

Patent document ES 2182671-A1 describes a system and method for notarising electronic transactions with a central server which performs actions like traditional notary interventions, i.e., they extract the basic data of the transaction and its identification number and the validity of the digital signature or signatures of the parties is verified and it is dated and signed. The results of these processes are associated in a single log with the data of the transaction, this set being a notarised document.

However, in the previous case the server is a mere custodian of the information, and the server cannot trace the transaction from beginning to end with the information of the time in which it occurred. Therefore, the server cannot assert the exchange of information carried out between emitter and receiver or the date and time of said action.

DESCRIPTION OF THE INVENTION

In its first and second aspects, the present invention relates to respective methods for notarising electronic transactions, and in a third aspect it relates to a system adapted to apply said methods. The invention allows sending a document from an emitter to a receiver in a secure manner, the transaction executed being traceable from beginning to end, including the moment in which the actions were carried out by the parties, and repudiation in the origin and destination being avoided.

In a first aspect, the present invention relates to a method for notarising electronic transactions, of the type comprising the use of a system comprising:

a first computerised system, or emitter, connected to a communication network and controlled by a first user, for sending through said communication network at least one electronic document representative of at least part of an electronic transaction with a second user, or receiver, a second computerised system, or receiver, connected to said communication network and controlled by said second user, for at least receiving through said communication network said electronic document, and a server connected to said communication network, which operates as a trusted third party for electronic transactions, with at least one storage module for storing in a secure repository at least said electronic document, and adapted in such a way as to offer a custody and non-repudiation service and to vouch for the existence and content of the electronic document.

The method proposed by the first aspect of the present invention comprises:

a) said emitter sending information, including said electronic document and a request to send same to said receiver, to said server, b) said server generating at least a first digital summary, commonly known as hash, of said electronic document and/or of said request, c) said server sending said first digital summary to a timestamping entity through said communication network or another one, d) said timestamping entity generating a timestamp for said first digital summary, associating it with same and registering it, e) said timestamping entity sending said first timestamped digital summary to the server, f) the server identifying the receiver and enabling it to access the electronic document, which is stored in said secure repository of the trusted third party server, and g) the server sending an electronic address or link to the receiver through the communication network for accessing the electronic document.

The emitter is responsible for creating the mentioned requests, which can be notification and/or procurement requests. The emitter can track the status of all the transactions by means of the present method.

The transactions can be represented by any type of document relating to a contract, purchase order, invoices, checks, administrative notifications or any type of document which, due to its importance, must be sent and received in a secure manner, avoiding repudiation and needing a detailed tracking of the actions carried out on it along with the moment in which each of such actions occurred.

The present method and system can be used in electronic transactions which are carried out between:

A business and an individual user (B2C, Business to Consumer) and vice versa.
Between two businesses (B2B, Business to Business).
Between two consumers (C2C Consumer to Consumer).
Between a public administration and a citizen, and vice versa.

The server will be connected with another independent trusted third party entity (dual trusted third party) responsible for functions independent from those of the server, making the system more robust. This second trusted third party entity, hereinafter, timestamping entity, can be a notary certification agency, which participates in steps c), d) and e) described above.

In a preferred embodiment, after an authentication the receiver obtains permissions in the trusted third party server to retrieve and/or procure those electronic documents sent to it by the emitter using this notarization and procurement system.

To that end, the method comprises authenticating the receiver and the receiver accessing the server by means of performing steps h), i), j) and k) after said step g).

For a preferred embodiment, the mentioned authentication is a delegated authentication in the emitter, said steps h), i), j) and k) being the following:

h) the receiver establishing communication with the emitter through the communication network, the receiver accessing a web portal of said emitter by means of using said electronic address or link received in step g), and requesting access to the service, and i) authenticating the receiver in a delegated manner in the emitter and informing the server of the result of said authentication, j) the emitter redirecting the receiver to the server, specifically to the secure repository thereof where the document exchanged by means of secure protocols for the delegation of the authentication activities based on trust relationships, such as SAML for example, is housed, and k) the server checking that there is coherence in the redirecting of the receiver, that the authentication of the receiver performed by the emitter is valid in accordance with the trust relationship existing with the trusted third party server and registering the access of the receiver in a session log of said receiver.

For another embodiment, the receiver is authenticated directly in the server, said steps h), i), j) and k) being the following:

h) the receiver establishing communication with the server through the communication network, accessing a web page of the server, and requesting access to said electronic document, i) authenticating the receiver in the server by means of checking an electronic credential (such as an electronic ID number or a digital certificate) sent by the receiver on its own initiative or after a prior request from the server, j) allowing said receiver to access the server if said authentication is valid and there is a request to send from an emitter for said receiver, and k) the server registering said access.

Once the receiver is in the access enabled for downloading the document by the trusted third party server, the method proposed by the first aspect of the invention comprises performing the following steps:

l) the receiver requesting the download of said electronic document from the server, m) the server requesting an operation code, an electronic signature or another kind of identifier from the receiver for an acceptance to retrieve the electronic document, n) the receiver accepting the retrieval of the electronic document by means of sending said operation code, said electronic signature or said identifier of another kind to the server, o) accepting (validating and/or verifying) the operation code, the electronic signature or the identifier of another kind and registering said acceptance, and p) the server enabling and carrying out the download of the electronic document to the receiver.

For the purpose of performing said steps m), n), and o) the trusted third party server will enable different acceptance means based on the use of an operation code similar to a PIN known only by the receiver, the use of an electronic signature or another signature mechanism.

For the use of the signature mechanism based on an operation code, an isolated system will be used to create and send the operation code valid only for the operation taking place, referred to as a one-time-token, through a channel different from the one used in the acceptance such that only the receiver can know said operation code.

For one embodiment, said different channel is a mobile telephony network, and the method proposed by the first aspect of the invention comprises performing said sending of said operation code in the form of a text message (SMS).

Step n) is carried out for one embodiment by means of the receiver introducing said operation code in a web form provided by the trusted third party server, or using said electronic signature or identifier of another kind.

The method proposed by the first aspect of the invention comprises performing the following steps after said step p):

q) the server generating at least a second digital summary, or "hash", based on information relating to the history of the electronic document, r) the server sending said second digital summary to said timestamping entity through said communication network or another one, s) said timestamping entity generating a timestamp for said second digital summary, associating it with same and registering it, t) said timestamping entity sending said second timestamped digital summary to the server, u) the server filing and safeguarding the electronic document and its history, and v) the server sending information, including a summary of the operations occurring with the original electronic document, to the emitter and to the receiver through the communication network.

For one embodiment, the electronic document is a notification, the acceptance to retrieve said notification being registered in said step o) and the receiver being allowed in step p) to download the document. Delivery of the document is thus notified.

For another embodiment, the method proposed by the first aspect of the invention contemplates the acceptance of not only the retrieval of the electronic document, but also the acceptance of its content, as is the case in which the electronic document is a contract, for which the method comprises performing the following steps after step p):

the receiver accepting the content of the electronic document by means of sending said operation code, said electronic signature or said identifier of another kind to the server, and the server registering said acceptance of the content of the document.

As previously discussed, step q) for generating a second "hash" is carried out based on information relating to the history of the electronic document, said history relating to the actions carried out by the parties on the electronic document, namely, sending, reception/notification, acceptance of the reception and/or of the content, etc.

As has been explained, it is possible to perform a notification of the transaction and/or procurement of same by means of the method proposed by the first aspect of the invention.

For the case in which synchronous procurement of the electronic transaction is to be performed, the present invention also relates in a second aspect to a method the application of which allows said synchronous procurement, in which case the receiver is located in the portal of the emitter and it is the receiver that requests a certain contract from the emitter.

The method proposed by the second aspect of the invention comprises the use of a system such as the one used by the method of the first aspect, and is characterised in that it comprises:

i) said receiver establishing communication with said emitter through said communication network and requesting access to said electronic document, ii) said emitter sending information, including a request to send said electronic document, to said server, iii) said server generating at least a first digital summary, of at least said request, iv) said server sending said first digital summary to a timestamping entity through said communication network or another one, v) said timestamping entity generating a timestamp for said first digital summary, associating it with same and registering it, vi) said timestamping entity sending said first timestamped digital summary to the server, vii) the server identifying the receiver and enabling it to access the electronic document, which is filed in said storage module of the server, viii) the emitter redirecting the receiver to the server, and ix) the server checking that there is coherence in the redirecting of the receiver and registering the access of same.

It may occur that steps iii) to vii) coincide with steps b) to f) of the method of the first aspect.

After said step ix), the method proposed by the second aspect of the invention comprises performing steps x) to xiv), which are equivalent to steps 1) to p) of the method of the first aspect of the invention.

With respect to the authentication of the receiver, such authentication can also be carried out in the same manner as that described for the first aspect of the invention.

The method proposed by the second aspect of the invention comprises performing steps xv) to xx), which are equivalent to steps q) to v) of the method of the first aspect, after said step xiv).

In the same manner as in the method of the first aspect of the invention, for the preferred embodiment of the method proposed by the second aspect of the invention relating to the synchronous procurement of the electronic transaction, such method contemplates the acceptance of the content of the electronic document, whereby the method proposed by the second aspect comprises performing the following steps after step xiv):

the receiver accepting the content of the electronic document by means of sending said operation code, said electronic signature or said identifier of another kind to the server, and the server registering said acceptance of the content of the document.

A third aspect of the invention relates to a system for notarising electronic transactions such as the one described when describing the methods proposed by the invention, which is communicated with the mentioned timestamping entity through said communication network or another one, and adapted to carry out the method according to the first and the second aspects of the invention, the transaction executed being traceable from beginning to end, including the moment in which the actions were carried out by the parties, emitter and receiver, and repudiation in the origin and destination being avoided.

DETAILED DESCRIPTION OF THE DRAWINGS

To complete the description that is being made and for the purpose of aiding to better understand the features of the invention according to a preferred practical embodiment thereof, a set of drawings is attached as an integral part of said description in which the following has been depicted with an illustrative and non-limiting character:

DESCRIPTION OF A PREFERRED EMBODIMENT

Figure 1:
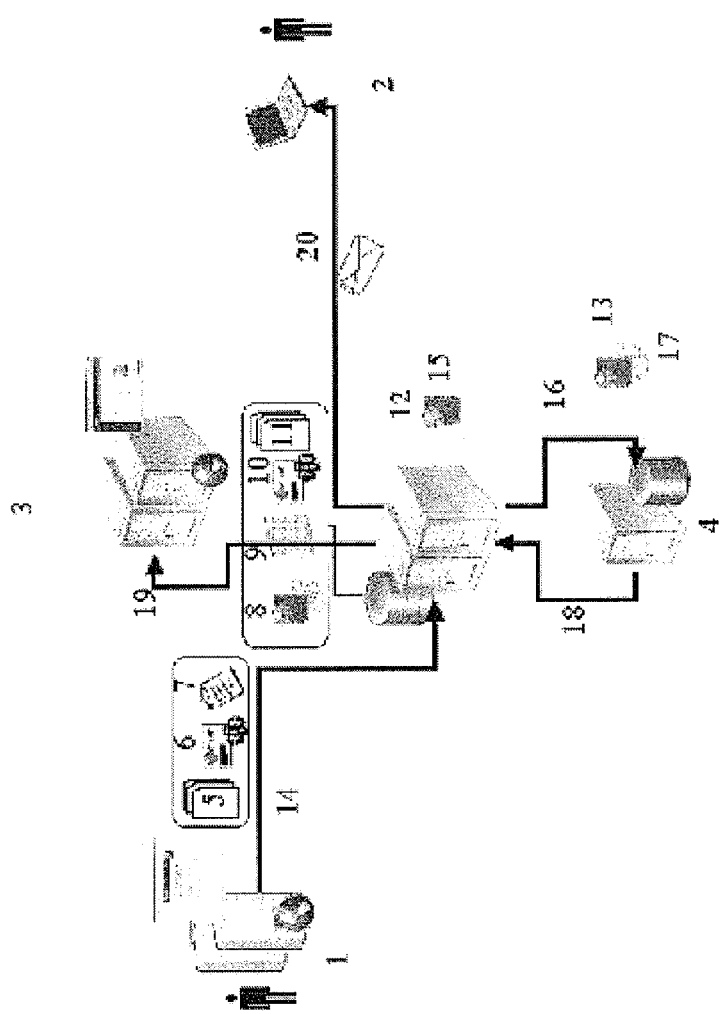
FIG. 1 shows the steps followed for the request to send a notification and/or procurement.
Figure 2:
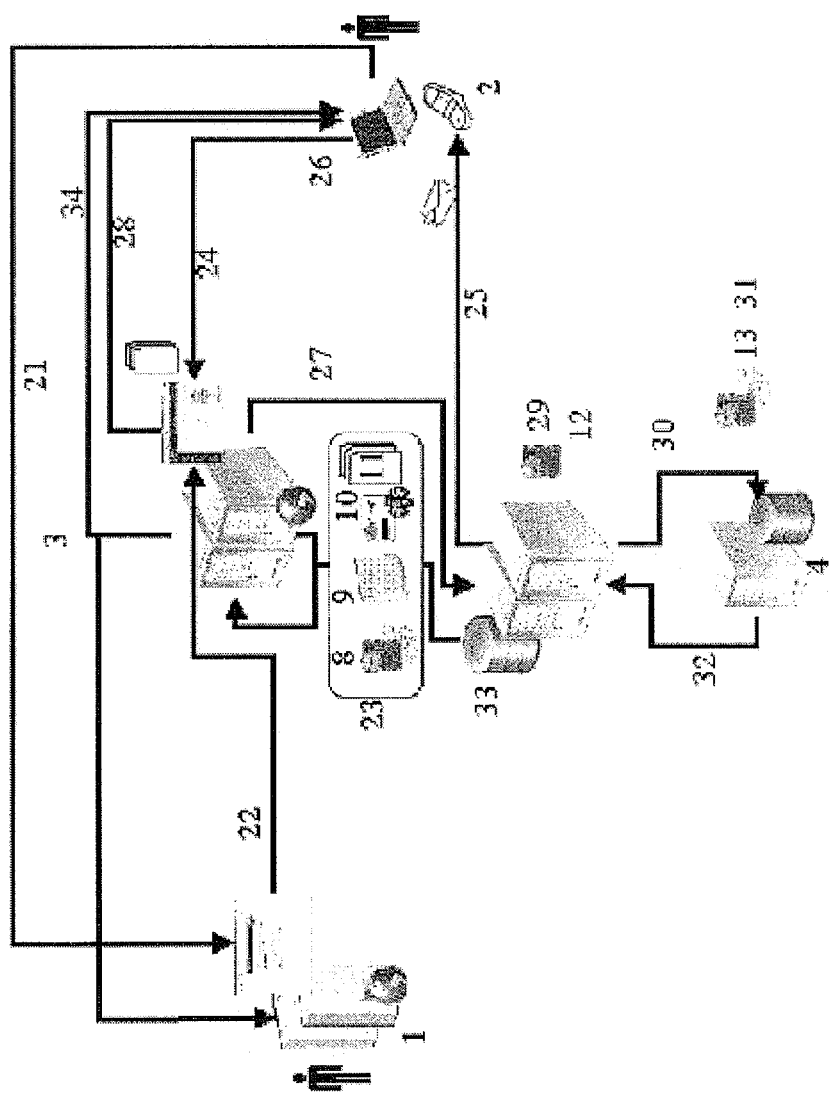
FIG. 2 shows the steps followed for the retrieval of a notification.
Figure 3:
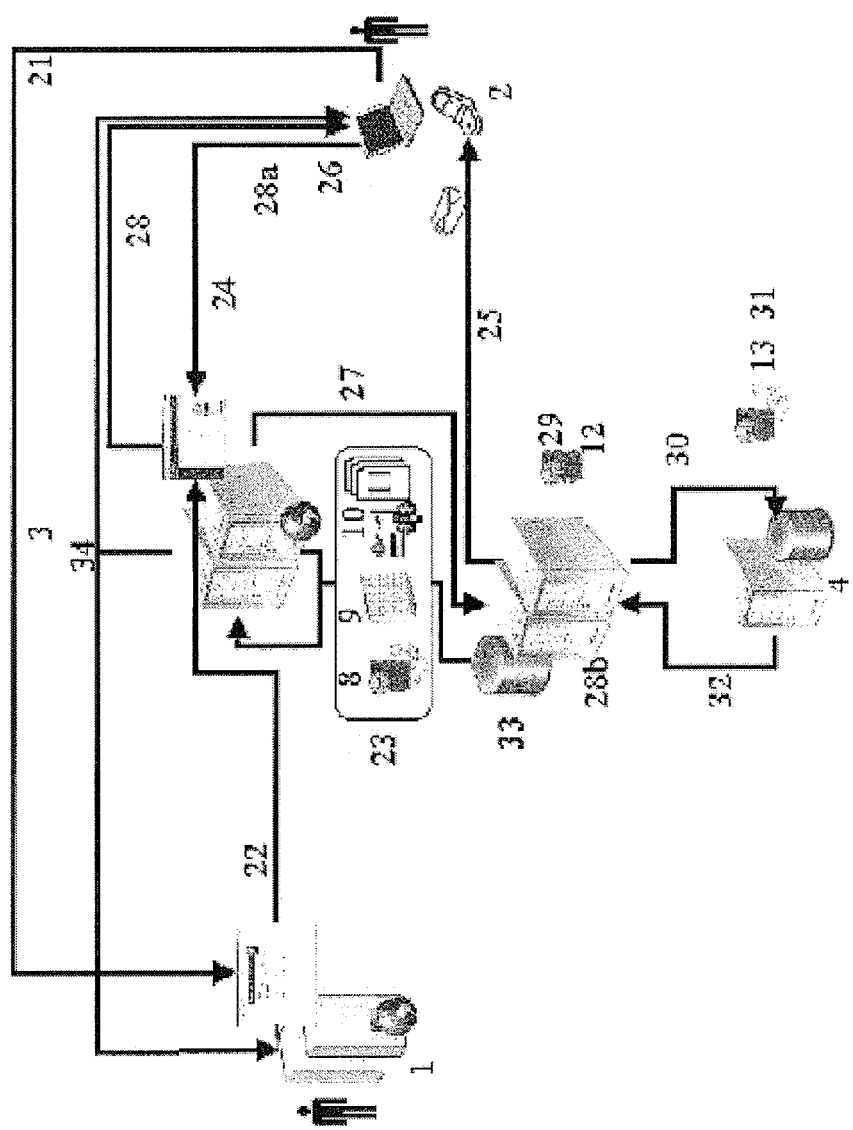
FIG. 3 shows the steps followed for the retrieval of a notification.
Figure 4:
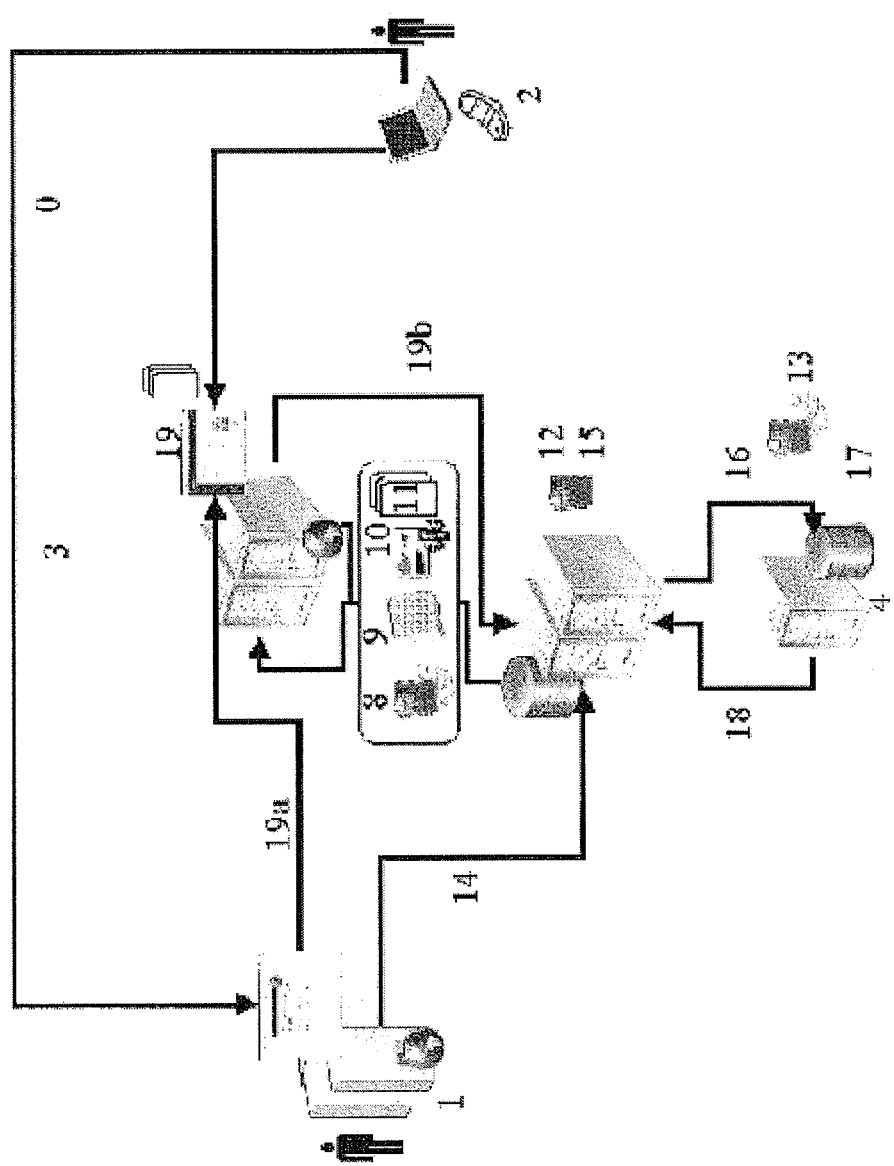
FIG. 4 shows the steps followed for the request to send synchronously.
Figure 5:
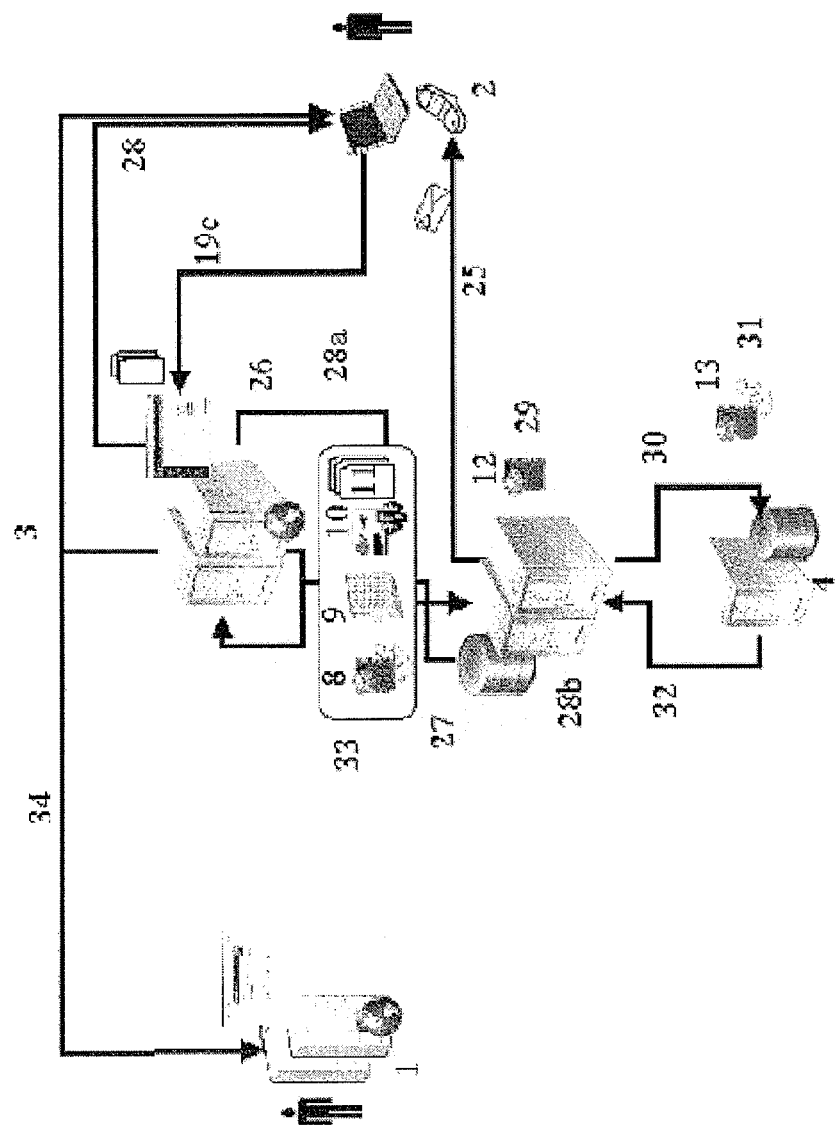
FIG. 5 shows the steps followed for procurement synchronously.

The present invention, a system and method for notarising electronic transactions, allows sending a document 5 from an emitter 1 to a receiver 2 in a secure manner, the transaction executed being traceable from beginning to end, including the moment in which the actions were carried out by the parties, and repudiation in the origin and destination being avoided.

The system is made up of a first computerised system, or emitter 1, connected to a communication network and controlled by a first user, for at least sending through said communication network at least one electronic document 5 representative of at least part of an electronic transaction with a second user, or receiver 2. The emitter will be the one that creates the notifications and/or procurement requests. The emitter 1 can track the status of previous transactions by means of the present system and method.

The transactions can be of any type of document 5 relating to a contract, purchase order, invoices, checks, administrative notifications or any type of document 5 which, due to its importance, must be sent and received in a secure manner, avoiding repudiation and needing a detailed tracking of the actions carried out on it along with the moment in which each of such actions occurred. The format of the electronic transactions does not have to be a specific one, being able to be any currently existing format (Word, Excel, pdf, ppt, . . . ).

The system in turn comprises a second computerised system, or receiver 2, connected to said communication network and controlled by a second user, for at least receiving through said communication network said electronic document 5.

The system is completed with a server 3 connected to said communication network, which operates as a trusted third party for electronic transactions, with at least one storage module for storing the electronic document 5, and adapted in such a way as to offer a custody, integrity and repudiation service and to vouch for the existence and content of the electronic document.

The server 3 will be connected with another independent timestamping entity (dual trusted third party) 4 responsible for functions independent from those of the server, making the system more robust. This timestamping entity 4 can be a notary certification agency, such as ANCERT for example, etc. . . .

The method begins with the emitter 1 sending information, including the electronic document 5 and a request to send 14 said document to a receiver 2, to the trusted third party server 3. Prior to sending the information and the request to send 14, it is necessary for an authentication of the emitter 1 in the trusted third party server 3 to occur.

In order for the authentication of the emitter 1 in the trusted third party server 3 to occur, the emitter 1 connects to the trusted third party server 3 and proceeds to send its authentication credentials through a communication, for example by means of Virtual Private Networks (VPN) or Secure Sockets Layer (SSL).

These authentication credentials of the emitter can be the digital certificate, a pair of keys formed by the identifier and a password or the electronically signed information packet 6.

The sent credentials are verified in the trusted third party server 3 by checking, for example:

That it corresponds with a valid user of the system.
That the sent credentials are valid (the identifier (ID) corresponds with the password (PW) or the certificate is valid, not expired, etc).
That the signature of the packet or data is correct and is authorised.
That the communication comes from an authorised IP Internet address.

Once it has been checked that the credentials are correct, the emitter 1 is authenticated in the system and the authentication together with the execution of the desired operation, and the request to send 14 a document 5 to a receiver 2 or to a group of certain receivers, are performed in the same transaction.

As previously discussed, in order for an emitter 1 to create a notification or procurement request relating to a document 5 for a receiver 2, it is necessary for this emitter 1 to be authenticated in the trusted third party server 3. The request to send 14 must contain at least the following information:

Binary document of the document to be sent to the receiver or receivers 5.
Signature of the binary document 6.
Metadata of the receiver (all the data necessary for univocally identifying the receiver) for example 7:
  email
  mobile
  Foreign Residency Permit Number
  Passport
  Nationality
  Complete name
Complementary metadata 7:
  Service type: Notification, procurement
  Synchrony: YES NO
  Time for closing file
  Resend protocol: YES/NO
  Evidence custody time Once the information regarding sending a request 14 has been received, the trusted third party server 3 validates the signatures (validity of certificates, expiration, chain, hash . . . ) and creates a unique identifier for the request being processed.

The trusted third party server 3 in turn performs a timestamping 12 in the moment the request enters through an internal timestamping authority in the trusted third party server 3.

Once the validity of the request 14 has been checked and it has been stamped 12, this data is stored in a log 9 of the document/request 14 of that emitter 1 for that receiver 2 and/or group of receivers.

Next, the trusted third party server 3 will generate a first digital summary (hash) 15 of said electronic binary document 5 and/or of said request 14 received from the emitter It will then perform a timestamping 17 of the digital summary (hash) made. The timestamping 17 is performed by a timestamping entity 4 independent from the trusted third party server 3. This timestamping entity 4 can be a notary certification agency or other certifying entities.

The timestamping 17 by this timestamping entity will be performed after having sent the digital summary (hash) 16 to same through a communication network. The timestamping entity 4 will in turn register said stamping and will send it back 18 to the trusted third party server 3.

Once the document is stamped, it is identified to the receiver 2, searching for the identity of the receiver 2 provided by the emitter 1. The trusted third party server 3 calculates the unique identifier corresponding to the identity of the entered data from the portal of the emitter 1 with the following data serving to univocally identify it, for example:

Foreign Residency Permit Number
Passport
Nationality
Complete name
[others]

The trusted third party server 3 proceeds to register the calculated identifier, in the event that it does not exist, with the remaining distinctive information about the receiver 2, making it depend on the source of the information, i.e., on the emitter 1.

Once the previous actions are performed, the trusted third party server 3 enables the receiver 2 to access the electronic document 19 and returns the identifier number of the item sent to the emitter 1 with the current status of the transaction.

In order to enable access to the document 19, the trusted third party server 3 sends a mail 20 to the receiver 2 with a link to a web page for accessing the electronic document.

The receiver 2 must be authenticated in order to be able to access the document. This authentication will be done in a delegated manner in the portal of the emitter 1, establishing communication between receiver 2 and emitter 1 through a communication network and requesting access to the server 21. Another way of authenticating the receiver is by means of electronic certificates or an electric ID number. In any case, authentication will be necessary for the receivers 2 to access the documents.

In the event that a delegated authentication occurs, the credential validation processes are performed by the portal of the emitter 1 and all that reaches the trusted third party server 3 is the affirmation of the relevant checks. Therefore, the delegated authentication means that the identity of the receiver 2 is not known by the trusted third party server 3 but rather through the emitter 1.

The delegated authentication can be brought about by two circumstances:

The receiver 2 is authenticated in the portal of the emitter 1 and requests being connected with the trusted third party server 3.

The receiver 2 uses the link sent to it in the notification mail. This link sends it to the portal of the emitter 1 to be authenticated and then automatically redirects it to the web repository of the trusted third party server 3.

In both cases, the portal of the emitter 2 sends the authentication performed on the user of the portal 22, the receiver 2, to the trusted third party server 3. The trusted third party server 3 verifies the affirmations received from the portal of the emitter 1, checking:

That the data received come from an authorised portal for authenticating, i.e., there is an emitter 1 associated with said portal.

The affirmation is correct.

In addition, the trusted third party server 3 checks if the credentials (the human identity) exist in the trusted third party server 3 of the receiver 2.

Receivers 2 not known by the trusted third party server are thus prevented from entering, i.e., a receiver 2 entering without any emitter 1 having requested a specific service from the trusted third party server 3 for that receiver 2.

As has already been discussed, the authentication of a receiver 1 is also possible if it possesses an electronic certificate which the trusted third party server 3 allows for the identification and signature.

In this case, the receiver 2 enters the web of the trusted third party server 3 and requests identifying itself to access its pending notifications and procurements. The trusted third party server 3 shows a presentation display in which a certificate can be introduced to identify itself. The trusted third party server 3 checks the identity of the receiver 2 with the certificate provided. It in turn verifies that the identity of the user (credentials of the receiver 2 for the trusted third party server 3) corresponding to that certificate exists.

In the event that there is no request (or there was and it was filed) from an emitter 1 for that receiver 2, the latter is denied access.

If the authentication is carried out in a delegated manner, the emitter 1 authenticates the receiver 2 and once it is performed, it informs the trusted third party server 3 of its checks, in turn redirecting 22 the receiver 2 to the repository of the trusted third party server 3 where the document exchanged by means of secure protocols for the delegation of the authentication activities based on trust relationships, such as SAML for example, is housed.

The trusted third party server 3 checks that there is coherency 23 in the redirecting of the receiver 2, checks the validity of the authentication of the receiver 2 performed by the emitter 1 according to the trust relationship 3 existing with the trusted third party server 3 and registers the access of the receiver 2 in the session log 9 of said receiver 2.

Once the receiver 2 is enabled by the third party server 3 in the access for downloading the document, the receiver 2 requests from the trusted third party server 3 the download of the electronic document 24.

The access enabled for downloading documents creates a display for downloading the active documents for notification and/or procurement available to a receiver 2 based on its authentication. Before downloading the document, acceptance will be obtained by means of an operation code sent by SMS to the receiver or by electronic signature 25.

The created display will contain, inter alia, the following information:

Details of the document: emitter, date, item sent, status
Information of the maximum time for accepting the notification and/or procurement
Information about the use of the PIN or electronic signature (identifying which certificates are accepted) for acceptance
Close button
Notification signature button The receiver 2 clicks on the acceptance button of the notification after having selected either "Use of PIN" or "Use of certificate".

As previously mentioned, the trusted third party server 3 will send to the receiver 2 an operation code for accepting the notification 25 if the receiver 2 does not have an electronic signature or other means of authentication. One way of sending the operation code will be by means of sending an SMS.

The receiver 2 accepts the retrieval of the electronic document 26 by means of sending said operation code or said electronic signature, etc., to the trusted third party server 3.

The server 3 registers the acceptance of the notification 27 and allows the receiver 2 to download the document 28. The delivery of the document would thus be notified. The acceptance of the notification is registered by means of calculating the digital summary (hash) of the delivery acceptance operation and an internal timestamping with the hash calculated. The log and its stamping are saved in the history of the document. Then the document file is closed.

Access to all the active documents is allowed for a receiver 2, allowing it to browse through the different documents and the actions defined for each of them (reading and acceptance) as well as their corresponding status (sent, read, accepted, status modification date . . . ), etc.

If the authentication is performed by an emitter 1 (delegated authentication), the receiver 2 can only access items sent of this emitter 1. If the authentication is performed by the trusted third party server 3 by means of certificates, the receiver 2 would access all the items sent of any emitter.

Browsing through the various documents is also allowed for an authenticated receiver 2 filtering the documents by the following fields, inter alia:

modification date
document identifier
title of the document
status
emitter

The receiver 2 fills in the data of the filtering fields of the display with the list of documents with the values corresponding to those of the search and clicks on the search button.

When a receiver user 2 closes the session, the session log(access and browsing) is compiled and associated with a user. In this case, the digital summary (hash) 12 of the information of the log is also calculated by performing an internal timestamping with the hash calculated and storing the log and its stamping associated with the receiver.

In one embodiment, the procurement (content acceptance) of a document is allowed, this act not being mandatorily necessary. To that end, the electronic document 28a is accepted by the receiver 2 with said operation code or with said electronic signature (etc.), and the trusted third party server 3 registers the signed document 28b.

If it has been invoked for a procurement which is performed in the same session as the acceptance of the download, a new operation code would not be generated and the same operation code would be used. The trusted third party server 3 verifies the operation code entered and registers the acceptance of the document. The digital summary (hash) 29 of the information of the log is then calculated by performing internal timestamping with the hash calculated and storing the log and its stamping.

If the procurement (content acceptance) is performed by means of using an electronic certificate instead of an operation code, the receiver must select the certificate it wishes to use to sign the operation or document.

The trusted third party server 3 validates that the certificate corresponds with one of those allowed by its policies. The credentials of the certificate are verified in accordance with the known data of the receiver 2. Finally, the signature on the digital summary (hash) is calculated.

After the notification and/or procurement, the trusted third party server 3 generates at least a second digital summary (hash) 29 based on information relating to the actions performed by the parties on the electronic document, namely, sending, reception/notification, acceptance, etc.

This second digital summary 29 is timestamped by a timestamping entity 4. The trusted third party server sends the second digital summary (hash) to the timestamping entity 4 through said communication network or another one 30.

The timestamping entity 4 generates a timestamp 31 for said second digital summary (hash), associates it to same and registers it. Once these actions have concluded, the timestamping entity 4 sends 32 the timestamped digital summary (hash) to the trusted third party server 3.

The trusted third party server 3 closes the life cycle of the electronic document blocking the actions that can be performed on it 33 and sends a document summarizing all the operations occurring on the electronic document to the emitter 1 and receiver 2 through the communication network 34.

In another preferred embodiment, the previous method can be carried out synchronously. In this case, the method is based on the premise that the receiver 2 is located in the portal of the emitter 1 and it is the receiver 2 that requests 0 a certain document from the emitter 1. All the other steps would be carried out similarly to what is described above.

There is a possibility that the trusted third party server 3 periodically compiles the status information (degree of advancement) of all the items sent of each emitter and sends it to the emitter.

There is a possibility of sending notification reminders to the receivers 2 as the periods established from when a document is sent without the receivers having accessed such document elapse.

This action is activated when a certain period, which can be configured from sending the electronic mail to the receiver 2, within which the receiver 2 has not accessed the corresponding document, elapses. In order for this action to occur the emitter 1 has to previously indicate it. A new mail is sent from the trusted third party server 3 to the receiver 2 as a reminder that it has a document which it has not yet accessed.

When an operation or document is closed or blocked, it means that the document is no longer available on-line for the receiver 2 or the emitter 1, that it is safeguarded and that actions cannot be performed on the document. This action can be brought about by the success of the notification or procurement operation or by the lapsing of the stipulated lifetime of a request of the emitter 1 without the receiver 2 performing any definitive action.

When a file is closed, a "certificate" signed by the trusted third party server 3 of the final situation of the file is created, indicating:

Certificate creation date
Document identifier
Description of the operation provided by the emitter
Hash of the document
Data of the emitter
Data of the receiver
Date sent (and forwarded, where appropriate)
Status of the document at closing (Most significant action of the receiver: Nothing, Notification, Acceptance/Refusal) and comments, where appropriate
Date of receiver acceptance or file closing (in case of non-acceptance)
Signature of the trusted third party server of all the information The previous certificate issued by the trusted third party server 3 is sent to the mail of the receiver 2 and to the emitter 1. The document will be filed by the trusted third party server 3.

As explained throughout the steps of the method described, there are two types of stamping:

Timestamping by a second trusted third party or timestamping entity 4.
Internal timestamping.

In the case of timestamping by an independent timestamping entity 4, the trusted third party server 3 sends a request for timestamping to this timestamping entity 4 with the hash previously calculated. The timestamping entity 4 performs the timestamping and returns the stamping to the trusted third party 3. The trusted third party 3 receives the timestamping and stores it with the reference (identifier) of the corresponding document.

The internal timestamping is performed for intermediate events in addition to those of sending and closing a document. Once the document has been internally timestamped, the trusted third party server stores it with the reference (identifier) of the corresponding document.

The invention claimed is:

1. A method for notarising electronic transactions, said method comprises:

a) an emitter sending information to a server, the information including an electronic document and a request to send the electronic document to a receiver, b) said server generating at least a first digital summary of the electronic document and/or of said request, c) said server sending said first digital summary to a timestamping entity through a communication network, d) said timestamping entity generating a timestamp for said first digital summary, associating the timestamp with the electronic document to create and register a first timestamped digital summary, e) said timestamping entity sending said first timestamped digital summary to said server, f) said server identifying the receiver and enabling it to access the electronic document, g) said server sending a communication comprising a link to a site controlled by said server to an electronic address of the receiver through the communication network for the receiver accessing the electronic document, l) the receiver requesting download of the electronic document from said server by accessing through the link to the site controlled by the server, m) said server requesting an operation code, an electronic signature or another kind of identification from the receiver for an acceptance to retrieve the electronic document, said operation code, generate by the server, not being included in the communication sent to the electronic address of the receiver comprising the link, n) the receiver accepting the retrieval of the electronic document by means of typing said operation code or said electronic signature or said identifier of another kind in said site controlled by said server, o) accepting, validating and/or verifying said operation code, said electronic signature or the identifier of another kind and registering said acceptance to retrieve the electronic document, p) said server enabling and carrying out the download of the electronic document to the receiver, wherein the receiver is authenticated and the receiver accesses said server, wherein said server sends said operation code to the receiver prior to said step m) using a SMS to a phone belonging to the receiver as a different channel other than that used for sending the communication with the link to the electronic document.

2. The method according to claim 1, comprising performing the following steps after said step p):

q) the server generating at least a second digital summary based on information relating to a history of the electronic document, r) the server sending said second digital summary to said timestamping entity through said communication network or another one, s) said timestamping entity generating a timestamp for said second digital summary, associating the timestamp with the second digital summary and registering the timestamp, t) said timestamping entity sending said second timestamped digital summary to the server, u) the server filing and safeguarding at least the electronic document, and v) the server sending information, including a summary of operations occurring with the electronic document, to the emitter and to the receiver through the communication network.

3. The method according to claim 1, wherein the receiver is authenticated and the receiver accesses the server using following steps:

h) the receiver establishing communication with the emitter through the communication network, and requesting access from the server, and i) authenticating the receiver in a delegated manner in the emitter and informing the server of a result of said authentication, j) the emitter redirecting the receiver to the server, and k) the server checking that there is coherence in the redirecting of the receiver and registering access of the receiver.

4. The method according to claim 3, comprising performing said establishment of said step h) by means of the receiver using said electronic address or link received in step g).

5. The method according to claim 3, wherein said receiver establishes communication with the emitter, accessing a web portal of said emitter, remaining in said portal of the emitter at least during said step i).

6. The method according to claim 5, comprising showing to said receiver in said portal or in a web page at least indexes of documents sent by at least said emitter for said receiver, allowing the receiver to browse through the documents, carrying out said step l) of requesting the download after the receiver selects one of said indexes of the documents shown.

7. The method according to claim 1, wherein the receiver is authenticated and the receiver accesses the server using following steps:

h) the receiver establishing communication with the server through the communication network, and requesting access to said electronic document, i) authenticating the receiver in the server by means of checking an electronic credential sent by the receiver on its own initiative or after a prior request from the server, j) allowing said receiver to access the server if said authentication is valid and there is a request to send from an emitter for said receiver, and k) the server registering said access.

8. The method according to claim 1, comprising authenticating the receiver and the receiver accessing the server by means of performing following steps h), i), j) and k) after said step g), after which the method comprises performing the steps l-p h) the receiver establishing communication with the server through the communication network, and requesting access to said electronic document, i) authenticating the receiver in the server by means of checking an electronic credential sent by the receiver on its own initiative or after a prior request from the server, j) allowing said receiver to access the server if said authentication is valid and there is a request to send from an emitter for said receiver, and k) the server registering said access in that it comprises performing said establishment of said step h) by means of the receiver using said electronic address or link received in step g); and in that said receiver establishes communication with the server, accessing a web page of the server, remaining in said web page of the server at least during said step i).

9. The method according to claim 1, comprising performing said sending of said operation code through a mobile telephony network.

10. The method according to claim 9, comprising performing said sending of said operation code in the form of a text message (SMS).

11. The method according to claim 1, wherein said electronic document is a notification.

12. The method according to claim 1, comprising performing the following steps after step p):

the receiver accepting the content of the electronic document by means of sending said operation code, said electronic signature or said identifier of another kind to the server, and the server registering said acceptance of the content of the electronic document.

13. The method according to claim 12, wherein said electronic document is a contract.

14. A method for notarising electronic transactions, said method comprising:

i) a receiver establishing communication with an emitter through a communication network, and requesting access to said electronic document, ii) said emitter sending information, including a request to send said electronic document, to a server, iii) said server generating at least a first digital summary of at least said request, iv) said server sending said first digital summary to a timestamping entity through said communication network or another one, v) said timestamping entity generating a timestamp for said first digital summary, associating the timestamp with the first digital summary to create and register a first timestamped digital summary, vi) said timestamping entity sending said first timestamped digital summary to the server, vii) the server identifying the receiver and enabling it to access the electronic document, the electronic document being filed in said storage module of the server, viii) the emitter redirecting the receiver to the server, and
ix) the server checking that there is coherence in the redirecting of the receiver and registering the access of the receiver,
x) the receiver requesting download of said electronic document from the server,
xi) the server requesting an operation code, an electronic signature or another kind of identifier from the receiver for an acceptance to retrieve the electronic document,
xii) the receiver accepting the retrieval of the electronic document by means of sending said operation code, said electronic signature or said identifier of another kind to the server,
xiii) the server accepting the operation code, the electronic signature or the identifier of another kind, and registering said acceptance, and
xiv) the server enabling and carrying out the download of the electronic document to the receiver,
wherein the server sends said operation code to the receiver using a channel other than that used for sending the electronic document.

15. The method according to claim 14, comprising authenticating the receiver in a delegated manner in the emitter or directly in the server prior to said step x).

16. The method according to claim 14, comprising performing the following steps after said step xiv):
xv) the server generating at least a second digital summary based on information relating to a history of the electronic document,
xvi) the server sending said second digital summary to said timestamping entity through said communication network or another one,
xvii) said timestamping entity generating a timestamp for said second digital summary, associating it with same and registering it,
xviii) said timestamping entity sending said second timestamped digital summary to the server,
xix) the server filing and safeguarding at least the electronic document, and
xx) the server sending information, including a summary of operations occurring with the electronic document, to the emitter and to the receiver through the communication network.

17. The method according to claim 16, wherein said electronic document is a contract, and in that the method is applied to synchronous procurement.

18. The method according to claim 14 comprising performing the following steps after step xiv):
the receiver accepting the content of the electronic document by means of sending said operation code, said electronic signature or said identifier of another kind to the server, and
the server registering said acceptance of the content of the electronic document.

19. A system for notarising electronic transactions comprising:
a first computerised system, or emitter, connected to a communication network and controlled by a first user, for sending through said communication network at least one electronic document representative of at least part of an electronic transaction with a second user, or receiver,
a second computerised system, or receiver, connected to said communication network and controlled by said second user, for at least receiving through said communication network said electronic document, and
a server connected to said communication network, the server operates as a trusted third party for electronic transactions, with at least one storage module for storing at least said electronic document, and further operates to offer a custody service and to vouch for existence and content of said electronic document,
wherein said system is communicated with a timestamping entity through said communication network or another one, and in that the timestamping entity is configured to create a timestamped digital summary of said electronic document, the transaction executed being traceable from beginning to end, including the time in which actions were carried out by parties, emitter and receiver, and repudiation in an origin and destination being avoided,
wherein at least one of the receiver, emitter and the server is embodied by a tangible component of the system and includes a processor,
wherein the server is operable to generate and send an operation code, separated from a link to a site sent to the receiver to retrieve said electronic document, to the receiver via an SMS sent to a phone belonging to the receiver, to request said operation code from the receiver for an acceptance to retrieve said electronic document, to validate said operation code from the receiver, and to register the acceptance to retrieve said electronic document.

* * * * *